United States Patent
Lothian

(10) Patent No.: US 9,977,643 B2
(45) Date of Patent: May 22, 2018

(54) PROVIDING BEAT MATCHING

(71) Applicant: Google Inc., Mountain View, CA (US)

(72) Inventor: Ryan James Lothian, London (GB)

(73) Assignee: Google LLC, Mountain View, CA (US)

( * ) Notice: Subject to any disclaimer, the term of this patent is extended or adjusted under 35 U.S.C. 154(b) by 369 days.

(21) Appl. No.: 14/565,035

(22) Filed: Dec. 9, 2014

(65) Prior Publication Data

US 2015/0160916 A1 Jun. 11, 2015

Related U.S. Application Data

(60) Provisional application No. 61/914,326, filed on Dec. 10, 2013.

(51) Int. Cl.
| | |
|---|---|
| G06F 3/048 | (2013.01) |
| G06F 3/16 | (2006.01) |
| G06F 3/0484 | (2013.01) |
| G11B 27/034 | (2006.01) |
| G11B 27/28 | (2006.01) |
| G10H 1/40 | (2006.01) |

(52) U.S. Cl.
CPC .......... *G06F 3/165* (2013.01); *G06F 3/04842* (2013.01); *G10H 1/40* (2013.01); *G11B 27/034* (2013.01); *G11B 27/28* (2013.01); *G10H 2210/021* (2013.01); *G10H 2210/076* (2013.01)

(58) Field of Classification Search
CPC ....... G06F 3/165; G06F 3/04842; G10H 1/40; G10H 7/008; G10H 2210/021; G10H 2210/076
See application file for complete search history.

(56) References Cited

U.S. PATENT DOCUMENTS

| | | | |
|---|---|---|---|
| 7,301,092 B1 * | 11/2007 | McNally | G10H 1/368 84/612 |
| 7,512,886 B1 * | 3/2009 | Herberger | G11B 27/034 715/723 |
| 7,525,037 B2 | 4/2009 | Hansson et al. | |
| 8,319,086 B1 | 11/2012 | Iampietro | |
| 8,605,795 B2 | 12/2013 | Wang et al. | |
| 9,747,949 B2 | 8/2017 | Lothian et al. | |

(Continued)

FOREIGN PATENT DOCUMENTS

| | | |
|---|---|---|
| EP | 2048803 | 4/2009 |
| WO | 1994/022128 | 9/1994 |
| WO | 2014/001607 | 1/2014 |

OTHER PUBLICATIONS

International Bureau of WIPO, International Preliminary Report on Patentability for International Patent Application No. PCT/US2014/069377, Jun. 14, 2016, 6 pages.

(Continued)

*Primary Examiner* — Dino Kujundzic
(74) *Attorney, Agent, or Firm* — IP Spring

(57) ABSTRACT

Implementations generally relate to providing beat matching. In some implementations, a method includes determining beat characteristics of at least one soundtrack. The method further includes selecting video clips based on one or more selection criteria. The method further includes adjusting a length of one or more of the video clips based on one or more beat matching policies. The method further includes combining the video clips to be played with the at least one soundtrack.

20 Claims, 7 Drawing Sheets

(56) References Cited

U.S. PATENT DOCUMENTS

| | | | |
|---|---|---|---|
| 2003/0160944 | A1* | 8/2003 | Foote .................... G03B 31/00 352/1 |
| 2005/0217462 | A1 | 10/2005 | Thomson |
| 2008/0208692 | A1* | 8/2008 | Garaventi ............ G06Q 20/102 705/14.69 |
| 2009/0049979 | A1* | 2/2009 | Naik ........................ G10H 1/40 84/636 |
| 2009/0150781 | A1 | 6/2009 | Iampietro |
| 2009/0223352 | A1 | 9/2009 | Matsuda |
| 2010/0080532 | A1* | 4/2010 | Ubillos ................ G06F 3/0486 386/241 |
| 2010/0118033 | A1* | 5/2010 | Faria .................... G06T 13/205 345/473 |
| 2010/0281375 | A1* | 11/2010 | Pendergast ........... G11B 27/034 715/723 |
| 2012/0086855 | A1 | 4/2012 | Xu et al. |
| 2012/0197966 | A1* | 8/2012 | Wolf ................ H04N 21/23424 709/203 |
| 2012/0210231 | A1 | 8/2012 | Ubillos et al. |
| 2013/0290843 | A1* | 10/2013 | Lehtiniemi ......... G06F 3/04842 715/716 |
| 2014/0023348 | A1* | 1/2014 | O'Kelly ............... G11B 27/031 386/278 |
| 2014/0096002 | A1 | 4/2014 | Dey et al. |
| 2014/0366710 | A1 | 12/2014 | Eronen |
| 2014/0372891 | A1* | 12/2014 | Winters ................. G11B 27/10 715/722 |
| 2015/0243325 | A1* | 8/2015 | Pacurariu ............. G11B 27/034 386/227 |

OTHER PUBLICATIONS

European Patent Office; International Search Report and Written Opinion from the EPO (ISA) related PCT/US2014/069377; dated Mar. 25, 2015, 9 Pages.

USPTO, Notice of Allowance for U.S. Appl. No. 14/616,191, dated Apr. 27, 2017, 9 pages.

USPTO, Non-final Office Action for U.S. Appl. No. 14/616,191, dated Jan. 20, 2017, 20 pages.

European Patent Office, International Search Report and Written Opinion mailed in PCT Application No. PCT/US2015/014918, dated May 12, 2015, 9 pages.

International Bureau of WIPO, International Preliminary Report on Patentability for International Patent Application No. PCT/US2015/014918, dated Aug. 16, 2016, 7 pages.

USPTO, Final Office Action for U.S. Appl. No. 14/616,191, dated Sep. 27, 2016, 24 pages.

USPTO, First Action Interview, Pre-Interview Communication for U.S. Appl. No. 14/616,191, dated Apr. 5, 2016, 5 pages.

USPTO, First Action Interview, Office Action Summary for U.S. Appl. No. 14/616,191, dated Jun. 3, 2016, 8 pages.

USPTO, First Action Interview, Pre-Interview Communication for U.S. Appl. No. 15/688,116, dated Sep. 25, 2017, 5 pages.

USPTO, First Action Interview, Office Action Summary for U.S. Appl. No. 15/688,116, dated Nov. 7, 2017, 17 pages.

USPTO, Notice of Allowance for U.S. Appl. No. 15/688,116, dated Jan. 19, 2018, 9 pages.

\* cited by examiner

The highest scoring of these is kept,
and the others are discarded

600

PROVIDING BEAT MATCHING

RELATED PATENT APPLICATIONS

This application is a non-provisional of and claims priority benefit to U.S. provisional patent application Ser. No. 61/914,326, filed Dec. 10, 2013.

BACKGROUND

Social network systems often enable users to upload media content such as photos, videos, music, etc. Social network systems also enable users to share various media content such as videos with each other. Some systems enable users to play music tracks along with videos. For example, while a video is playing, music can be played in the background.

SUMMARY

Implementations generally relate to providing beat matching. In some implementations, a method includes determining beat characteristics of at least one soundtrack. The method further includes selecting video clips based on one or more selection criteria. The method further includes adjusting a length of one or more of the video clips based on one or more beat matching policies. The method further includes combining the video clips to be played with the at least one soundtrack.

With further regard to the method, in some implementations, at least one beat characteristic includes which beats are first beats of a music bar. In some implementations, at least one beat characteristic includes beat times. In some implementations, at least one beat characteristic includes a time signature. In some implementations, at least one selection criteria includes duration of each video clip. In some implementations, the method further includes determining a length of each video clip. In some implementations, at least one beat matching policy includes maximizing a number of video clips that end on a first beat of a music bar. In some implementations, if a video clip ends on a first beat, the next video begins on the first beat of the music bar.

In some implementations, a non-transitory computer-readable storage medium carries program instructions thereon, where the instructions when executed by one or more processors cause the one or more processors to perform operations including: determining beat characteristics of at least one soundtrack; selecting video clips based on one or more selection criteria; adjusting a length of one or more of the video clips based on one or more beat matching policies; and combining the video clips to be played with the at least one soundtrack.

With further regard to the computer-readable storage medium, in some implementations, at least one beat characteristic includes which beats are first beats of a music bar. In some implementations, at least one beat characteristic includes beat times. In some implementations, at least one beat characteristic includes a time signature. In some implementations, at least one selection criteria includes duration of each video clip. In some implementations, the instructions further cause the one or more processors to perform operations including determining a length of each video clip In some implementations, at least one policy includes maximizing a number of video clips that end on a first beat of a music bar.

In some implementations, a system includes one or more processors, and logic encoded in one or more tangible media for execution by the one or more processors. When executed, the logic is operable to perform operations including: determining beat characteristics of at least one soundtrack; selecting video clips based on one or more selection criteria; adjusting a length of one or more of the video clips based on one or more beat matching policies; and combining the video clips to be played with the at least one soundtrack.

With further regard to the system, in some implementations, at least one beat characteristic includes which beats are first beats of a music bar. In some implementations, at least one beat characteristic includes beat times. In some implementations, at least one beat characteristic includes a time signature. In some implementations, at least one selection criteria includes duration of each video clip. In some implementations, the logic when executed is further operable to perform operations including determining a length of each video clip.

DETAILED DESCRIPTION

Implementations generally relate to providing beat matching. In some implementations, a system determines beat characteristics of at least one soundtrack. A soundtrack may be any audio recording or audio track, which the system plays in conjunction with a movie. As described in more detail below, the movie is made up of a series of video clips. In various implementations, the system selects video clips for the movie based on one or more selection criteria. The system adjusts the length of one or more of the video clips based on one or more beat matching policies. The system then combines the video clips into a movie to be played with the soundtrack. Implementations described herein provide aesthetically pleasing videos that meet various criteria.

Figure 1:
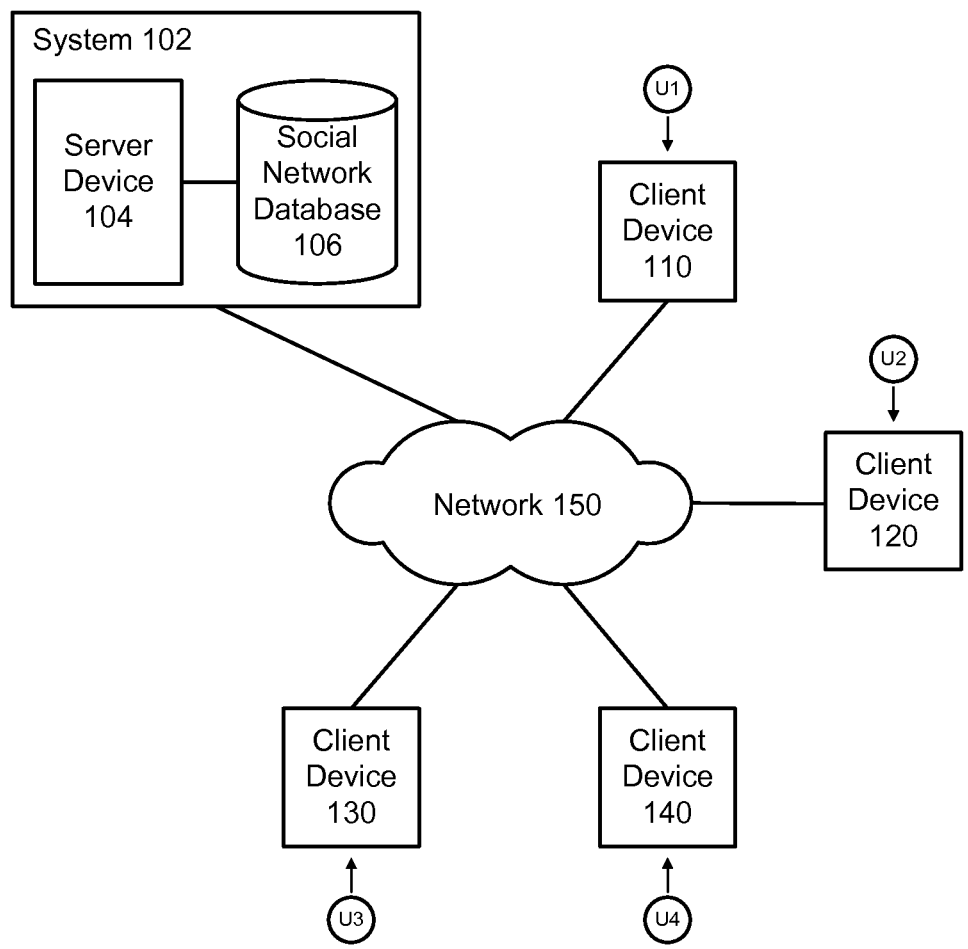
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may use respective client devices 110, 120, 130, and 140 to upload videos to system 102, view videos/movies, and share videos with each other.

In the various implementations described herein, the processor of system 102 causes the elements described herein (e.g., movies/videos and accompanying soundtracks, etc.) to be played in a user interface on one or more user devices.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc. Implementations may be implemented in a mobile application, in hardware and/or software, or as a server-side service.

Figure 2:
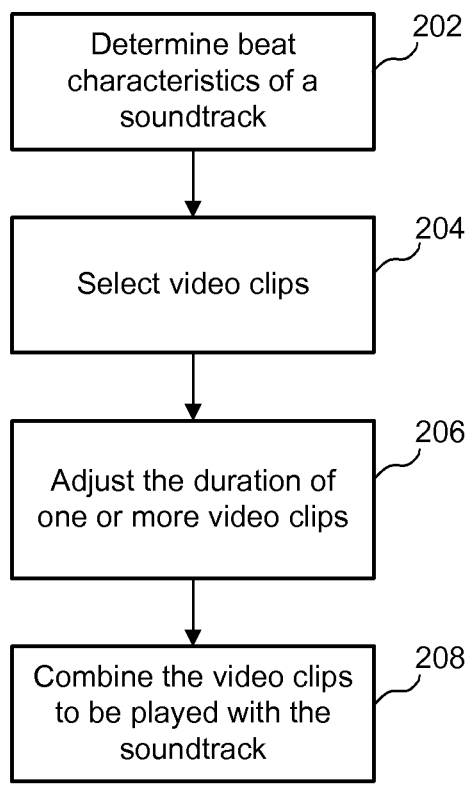
FIG. 2 illustrates an example simplified flow diagram for providing beat matching, according to some implementations.

FIG. 2 illustrates an example simplified flow diagram for providing beat matching, according to some implementations. Referring to both FIGS. 1 and 2, a method is initiated in block 202, where system 102 determines beat characteristics of at least one soundtrack. For example, in some implementations, beat characteristics may include which beats are first beats of music bars. A music bar may also be referred to as a bar or measure. In some implementations, beat characteristics may include beat times (e.g., beats per minute, etc.). In some implementations, beat characteristics may include a time signature (e.g., 4/4 time, 2/4 time, 3/4 time, etc.).

Figure 3:
FIG. 3 illustrates an example beat matcher, according to some implementations.

FIG. 3 illustrates an example beat matcher 300 of system 102, according to some implementations. In various implementations, beat matcher 300 may be implemented at least in part by a beat matching algorithm. Example implementations of a beat matching algorithm are described in more detail below.

In various implementations, a soundtrack and clip length constraints are inputted into beat matcher 300. As shown, beat matcher 300 of system 102 outputs clip lengths for each video.

In some implementations, system 102 stores a list of soundtracks. System 102 may automatically select a soundtrack, suggest a soundtrack for user selection, or receive a user preference or selection of a soundtrack. In some implementations, system 102 may enable the user to select a soundtrack from a library of soundtracks, or provide a soundtrack to system 102. In some implementations, system 102 enables the user to select a music preference (e.g., style of music). As such, system 102 may select or suggest a particular soundtrack based on the style of music.

In some implementations, beat matcher 300 of system 102 determines beat characteristics of the beats of the soundtrack. In some implementations, the beat characteristics (e.g., beats, beat times, bar times, time signature, etc.) for the soundtrack are an input to system 102. The beat characteristics need not be computed by the system 102, yet system 102 can compute one or more beat characteristics if needed. The beat characteristics may be produced by separate system(s), or otherwise annotated by human interaction. In some implementations, the soundtrack includes a list of timestamps of beats. In some implementations, the units of the timestamps are in microseconds. The actual units may depend on the particular implementation.

In some implementations, as a part of determining beat characteristics, beat matcher 300 determines each beat of the soundtrack that is the first beat of a music bar (e.g., first beat of a measure), and beat matcher 300 specifically marks those beats. Beat matcher 300 also determines each beat of the soundtrack that falls on a half bar (e.g., the third beat of a bar with a 4/4 time signature).

As indicated above, beat characteristics may include beat information. For example, a given soundtrack may be played a particular speed (e.g., 60 beats per minutes) and in a particular time signature (e.g., 4/4 time signature). In this example, the first beat at 1 second results in beat times: 1,000,000 us, 2,000,000 us, and 3,000,000 us). Also, the first beats of bars are at 1,000,000 us, 5,000,000 us, and 9,000,000 us.

In various implementations, video clip length constraints are also inputted into beat matcher 300. Such video clip length constraints may include default video clip lengths, minimum video clip lengths, and maximum video clip lengths for each video clip. Also, such video clip constraints may be in microseconds, or any other units, depending on the particular implementation. Example implementations of video clip length constraints are described in more detail below.

Figure 4:
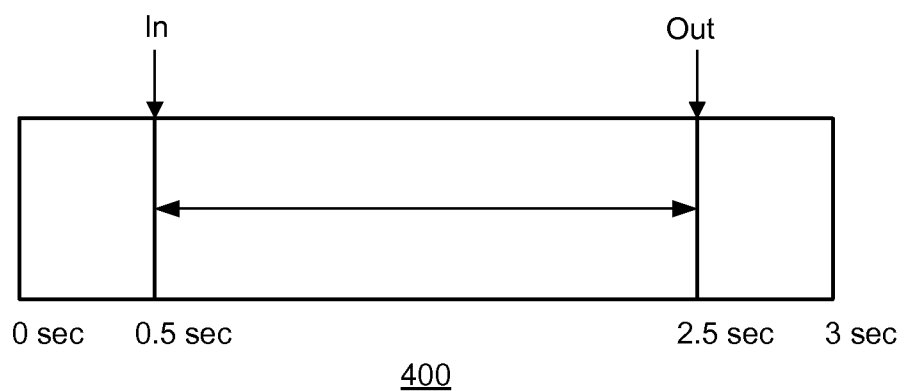
FIG. 4 illustrates an example timing diagram, according to some implementations.

FIG. 4 illustrates an example timing diagram 400, according to some implementations. In various implementations, system 102 determines one or more lengths, which may be referred to as video clip length constraints. Such video clip length constraints may include minimum and maximum lengths for video clips.

For example, referring to FIG. 4, if there is a 2 second video clip that is taken from the exact middle of a 3 second video, $Length_{default}$ would then be 2. In some implementations, system 102 adjusts video clips by moving the endpoint. As such, the video clip can extend to a maximum of 0.5 seconds. In this example, $Length_{maximum}$ is 2.5. In some scenarios, due to hardware restrictions on video playback, the phone hardware might not play back video clips of less than a particular length (e.g., 1 second). As such, $Length_{minimum}$ is 1.

Accordingly, in various implementations, each video clip has a minimum length (e.g., 1 second, in the example), a default length (e.g., 2 seconds), and a maximum length (e.g., 2.5 seconds).

Referring again to FIG. 2, in block 204, system 102 selects video clips based on one or more selection criteria. In some implementations, system 102 stores a list of video clips taken from larger videos and soundtracks. System 102 may automatically select such videos, suggest videos, and receive user preferences or selections of video clips.

In various implementations, system 102 selects candidate video clips for playback with the soundtrack by searching all of the video the user has taken during the course of a day. As indicated above, system 102 may select video clips based on one or more selection criteria. For example, such criteria may include video clips from the most colorful videos, the sharpest videos, videos containing the best facial expressions, etc.

In some implementations, system 102 may select video clips from videos taken during a predetermined time period (e.g., during the day, during the past 2 days, past week, etc.).

In some implementations, system 102 may enable the user to provide one or more video clips, or to swap one or more of the system-selected or system-suggested video clips with one or more user-selected video clips, or to add or remove one or more video clips.

In some implementations, at least one selection criteria includes length considerations of each video clip. For example, system 102 may select video clips that meet the video clip length constraints describe above.

In block 206, system 102 adjusts a length of one or more of the video clips based on one or more beat matching policies. In some implementations, system 102 first determines the length of each video clip. System 102 then applies one or more beat matching policies to determine how much to adjust each video clip, if at all.

In various implementations, system 102 adjusts the length of the video clips with one or more aesthetic goals or policies. For example, in various implementations, a policy may be to maximize the number of video clips that end on a first beat of a music bar. Ending on a half-bar is optional, but not as good as ending on a bar.

In some implementations, a policy may be to maximize the number of video clips that are as close as possible to their original length. In other words, the policy may be to minimize how much each video clip length is modified (e.g., trimmed or extended), so as to not modify lengths of the input footage more than is necessary. For example, if there are 3 video clips that are 3 seconds long, video clips are preferred that may be roughly in the 3 second range after beat matching, e.g., 2-4 second range, rather than much longer or much shorter.

In some implementations, a policy may be to keep the total length of the video clips as close as possible to the original total length. In other words, a policy may be to minimize the change in the total length of all video clips. As a result, the total length is more or less the same as it was before performing the beat matching. In some scenarios, a user may request a particular movie length to produce (e.g., 40 seconds, etc.). System 102 may enable the user to flip through soundtracks to select what they like.

System 102 adjusts the lengths of one or more of the videos by either shortening a video clip or adding more material to end of the clip (from original video).

In some implementations, system 102 may include static images or photos to include with the combination of video clips. System 102 may, for example, show a given image for a particular length of time (e.g., 2.5 seconds, 3 seconds, etc.).

In some implementations, the adjusting of the length of each of the one or more video clips is based on a scoring function. For example, the beat matching algorithm of system 102 uses the scoring function to quantify how well a given assignment of video clip lengths meet one or more aesthetic goals or policies.

System 102 evaluates which combination of video clips is best with respect to beat matching for the particular soundtrack. In various implementations described herein, a candidate combination of video clips may also be referred to a configuration. A given combination may In some implementations, the beat matching algorithm gives a certain number of points for each clip that ends on the first beat of a bar. The scoring function results in video clips that end on bar boundaries (e.g., first beat of a bar) more often than with conventional algorithms. This is because the dynamic programming algorithm gets better results than the (non-optimal) greedy algorithms.

In various implementations, the beat matching algorithm includes a scoring function, which includes a score penalty based on how much the total length of the movie varies from the original length. As a result, the total length of the movie varies less than with conventional algorithms.

In some implementations, the following expression may be used to determine the score for lengths associated with a particular combination of video clips.

$$\text{Score} = A*b + B*b_{1/2} - C*\sum_{per\ clip} \frac{\text{Length}_{new} - \text{Length}_{default}}{\text{Length}_{max} - \text{Length}_{min}} -$$
$$D*\text{Total Length}_{new} - \text{Total Length}_{default}$$

The variable b is the number of clips that end on a bar (e.g., ends on the first beat of a bar). The variable b ½ is the number of half bars (e.g., the third beat in a 4/4 time signature).

The second term of the equation that includes the C constant represents a penalty for how different each video clip is from its original length. For each video clip, the beat matching algorithm takes different between the video clip length before beat matching $\text{Length}_{default}$ and the video clip length after beat matching $\text{Length}_{new}$, and then divides the difference by the ranges working in (e.g., $\text{Length}_{max} - \text{Length}_{min}$).

The third/final term of the equation that includes the D constant represents a penalty for the how much the total length of the video has changes from its original total length (e.g., Total $\text{Length}_{new}$-Total $\text{Length}_{default}$).

A, B, C, D are configurable constants, which may be used to adjust the priorities (weights) of the beat matching algorithms (e.g., A=3, B=1, C=1, D=1).

In various implementations, the beat matching algorithm finds an assignment of video clip lengths that maximize this score. It progresses through the video clips in order.

Score is a resulting score for a particular combination or configuration of lengths for a combination of clips. The beat matching algorithm selects the configuration with the highest score, which will result in a configuration with the most video clips that end on a bar.

Figure 5:
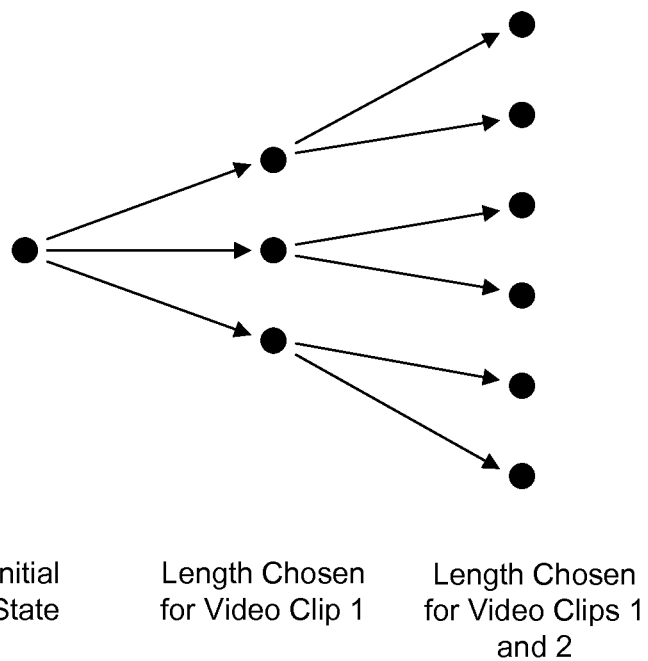
FIG. 5 illustrates an example video clip selection tree, according to some implementations.

FIG. 5 illustrates an example video clip selection tree 500, according to some implementations. As shown, at each level in the tree (progressing from the left side to the right side), the beat matching algorithm considers several lengths such that the size of the tree grows exponentially with the number of video clips. For example, in the initial state there is one video clip. Moving to the right, there may be 3 length choices for the video clip. Continuing to the right, the number of length choices of 2 video clips increases exponentially. Continuing further, for 15 video clips, there will be $3^{15}\approx 14$ million possible configurations. Examining all possible configurations would be computationally infeasible. As described in more detail below, the beat matching algorithm of system 102 selects a configuration efficiently.

In various implementations, system 102 uses a dynamic programming algorithm to choose the lengths of the clips. In various implementations, the dynamic programming algorithm breaks problems down into simpler subproblems and performs each subproblem only once, thus reducing or minimizing the number of computations. In various implementations, beat matching happens in less than 100 ms. In another example, a two-minute movie would take less than 0.5 seconds to beat match. So it is not a noticeable delay for the user.

In some implementations, system 102 may use a useful property of the scoring function to reduce the amount of work needed. In some implementations, the following expression may be used to determine an optimal configuration.

$$Score_{1 \ldots n} = f(score_{1 \ldots n-1}, \text{total length of } 1 \ldots n-1, \text{length choice at } n)$$

Figure 6:
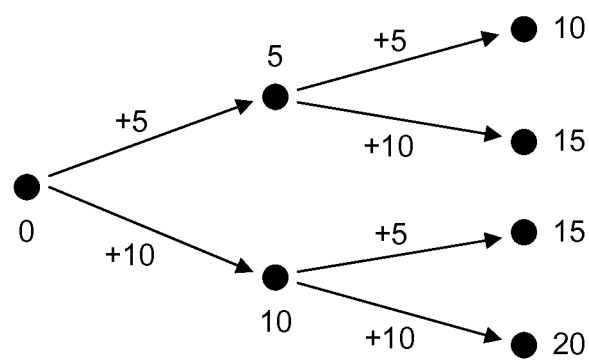
FIG. 6 illustrates an example video clip selection tree, according to some implementations.

FIG. 6 illustrates an example video clip selection tree 600, according to some implementations. In various implementations, the highest scoring of these is kept; the other discarded. As shown, the number at each node is a total number of seconds. The number at each line is a number of seconds that is added to get a new number of seconds at the next node (e.g., looking at the top numbers: 0+5=5; 5+5=10). For example, if there are 10 ways of making a total length of 30 seconds using clips 1, . . . , n−1, system 102 can discard 9 of these and only continue investigating the most highly scoring configuration. This "optimal substructure" allows system 102 to apply dynamic programming to the problem.

In some implementations, system 102 may also cull the partial solutions on each iteration of the algorithm, keeping only the 100 most promising configurations. This improves performance, even if it may result in the beat matching algorithm not finding the best configuration.

In some implementations, system 102 can also cull solutions that are very close together. For example, if there are partial solutions of 15.0, 15.1, and 15.2 seconds total length, then unless the 15.1 solution is the best of the three, system 102 can discard it. This helps the algorithm pursue a more diverse range of potential solutions.

In some implementations, system 102 may use a dynamic program algorithm in combination with culling of partial solutions to provide good performance while still finding a near-optimal solution. In some implementations, system 102 may cull partial solutions in other ways to improve performance or avoid culling a good solution early.

Referring again to FIG. 2, in block 208, system 102 combines the video clips to be played with at least one soundtrack in a movie. In various implementations, the movie includes the selected video clips (possibly combined with static images), and plays such visual content in conjunction with the soundtrack. As described above, the videos (and possibly static images) change on bar changes of the soundtrack (e.g., on the first beat of a measure). In some implementations, system 102 may notify the user that system 102 has made a movie for the user.

Implementations described herein provide various benefits. For example, implementations described herein provide aesthetically pleasing videos that meet various criteria. Implementations also provide beat matching at high speeds.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 7:
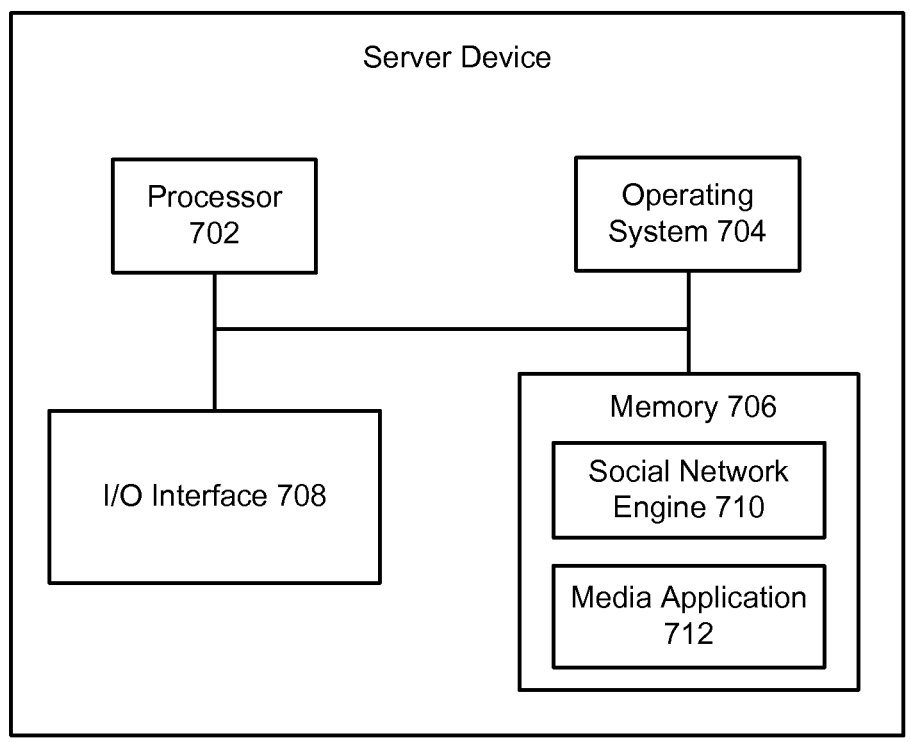
FIG. 7 illustrates a block diagram of an example server device, which may be used to implement the implementations described herein.

FIG. 7 illustrates a block diagram of an example server device 700, which may be used to implement the implementations described herein. For example, server device 700 may be used to implement server device 104 of FIG. 1, as well as to perform the method implementations described herein. In some implementations, server device 700 includes a processor 702, an operating system 704, a memory 706, and an input/output (I/O) interface 708. Server device 700 also includes a social network engine 710 and a media application 712, which may be stored in memory 706 or on any other suitable storage location or computer-readable medium. Media application 712 provides instructions that enable processor 702 to perform the functions described herein and other functions.

For ease of illustration, FIG. 7 shows one block for each of processor 702, operating system 704, memory 706, I/O interface 708, social network engine 710, and media application 712. These blocks 702, 704, 706, 708, 710, and 712 may represent multiple processors, operating systems, memories, I/O interfaces, social network engines, and media applications. In other implementations, server device 700 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A computer-implemented method comprising:
   determining beat characteristics of at least one soundtrack;
   selecting video clips based on one or more selection criteria;
   adjusting an original length of one or more of the video clips based on one or more beat matching policies;
   after adjusting the original length, scoring each of the video clips based on whether a respective video clip ends on a first beat of a music bar and a difference between the original length and an adjusted length of the respective video clip;
   determining a combination of video clips based on a respective score associated with each of the video clips to maximize a total score; and
   generating a movie that includes the combination of video clips with the at least one soundtrack.

2. The method of claim 1, wherein selecting the video clips based on one or more selection criteria includes selecting the video clips based on clip length constraints that include one or more of a default video clip length, a minimum video clip length, and a maximum video clip length.

3. The method of claim 1, wherein at least one of the beat characteristics comprises beat times.

4. The method of claim 1, wherein at least one of the beat characteristics comprises a time signature.

5. The method of claim 1, wherein selecting the video clips based on one or more selection criteria includes selecting the video clips associated with a user that were captured during a predetermined time period.

6. The method of claim 1, wherein generating the movie that includes the combination of video clips further includes including one or more static images in the movie, wherein the one or more static images change on beat changes of the at least one soundtrack.

7. The method of claim 1, wherein the one or more beat matching policies include maximizing a number of video clips that end on the first beat of the music bar.

8. A non-transitory computer-readable storage medium carrying program instructions thereon, the instructions when executed by one or more processors cause the one or more processors to perform operations comprising:
   determining beat characteristics of at least one soundtrack;
   selecting video clips based on one or more selection criteria;
   adjusting an original length of one or more of the video clips based on one or more beat matching policies;
   after adjusting the original length, scoring each of the video clips based on whether a respective video clip ends on a first beat of a music bar and how much an adjusted length of the respective video clip varies from an original length;
   selecting a particular combination of video clips based on the particular combination of video clips having a highest score; and
   generating a movie that includes the particular combination of video clips with the at least one soundtrack.

9. The computer-readable storage medium of claim 8, wherein at least one of the beat characteristics comprises which beats are first beats of the music bar.

10. The computer-readable storage medium of claim 8, wherein at least one of the beat characteristics comprises beat times.

11. The computer-readable storage medium of claim 8, wherein at least one of the beat characteristics comprises a time signature.

12. The computer-readable storage medium of claim 8, wherein selecting the video clips based on one or more selection criteria includes selecting the video clips associated with a user that were captured during a predetermined time period.

13. The computer-readable storage medium of claim 8, wherein generating the movie that includes the particular combination of video clips further includes including one or more static images in the movie, wherein the one or more static images change on beat changes of the at least one soundtrack.

14. The computer-readable storage medium of claim 8, wherein at least one of the one or more beat matching policies comprises maximizing a number of video clips that end on the first beat of the music bar.

15. A system comprising:
   one or more hardware processors; and
   logic encoded in one or more tangible media for execution by the one or more processors and when executed operable to perform operations comprising:
      determining beat characteristics of at least one soundtrack;
      selecting video clips based on one or more selection criteria;
      adjusting an original length of one or more of the video clips based on one or more beat matching policies;
      after adjusting the original length, scoring each of the video clips based on whether a respective video clip ends on a first beat of a music bar and a difference between the original length and an adjusted length of the respective video clip;
      determining a combination of video clips based on a respective score associated with each of the video clips to maximize a total score; and
      generating a movie that includes the combination of video clips with the at least one soundtrack.

16. The system of claim 15, wherein at least one of the beat characteristics comprises which beats are first beats of a music bar.

17. The system of claim 15, wherein at least one of the beat characteristics comprises beat times.

18. The system of claim 15, wherein at least one of the beat characteristics comprises a time signature.

19. The system of claim 15, wherein selecting the video clips based on one or more selection criteria includes selecting the video clips associated with a user that were captured during a predetermined time period.

20. The system of claim 15, wherein generating the movie that includes the combination of video clips further includes including one or more static images in the movie, wherein the one or more static images change on beat changes of the at least one soundtrack.

* * * * *